United States Patent
Vuggrala et al.

(10) Patent No.: US 11,985,004 B2
(45) Date of Patent: May 14, 2024

(54) MULTICAST WAN OPTIMIZATION IN LARGE SCALE BRANCH DEPLOYMENTS USING A CENTRAL CLOUD-BASED SERVICE

(71) Applicant: HEWLETT PACKARD ENTERPRISE DEVELOPMENT LP, Houston, TX (US)

(72) Inventors: Shravan Kumar Vuggrala, Bangalore (IN); Raghunandan Prabhakar, Bangalore (IN); Shankar Kambat Ananthanarayanan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/573,919

(22) Filed: Jan. 12, 2022

(65) Prior Publication Data
US 2023/0224187 A1 Jul. 13, 2023

(51) Int. Cl.
*H04L 12/28* (2006.01)
*H04L 12/18* (2006.01)
(Continued)

(52) U.S. Cl.
CPC ...... *H04L 12/2863* (2013.01); *H04L 12/1822* (2013.01); *H04L 12/185* (2013.01); *H04L 12/4641* (2013.01); *H04L 12/66* (2013.01)

(58) Field of Classification Search
CPC ............... H04L 12/1822; H04L 12/185; H04L 12/2863; H04L 12/4641; H04L 12/66
(Continued)

(56) References Cited

U.S. PATENT DOCUMENTS

| 7,519,010 | B1 | 4/2009 | Aggarwal |
| 8,638,787 | B2 | 1/2014 | Wijnands |

(Continued)

FOREIGN PATENT DOCUMENTS

| WO | 2020/091736 A1 | 5/2020 | |
| WO | 2020/091737 A1 | 5/2020 | |
| WO | WO-2020091737 A1 * | 5/2020 | .......... H04L 61/1511 |

OTHER PUBLICATIONS

Alcatel Lucent, "The LTE Network Architecture a comprehensive tutorial", Strategic White Paper, 2009, 26 pages.

*Primary Examiner* — David P Zarka
(74) *Attorney, Agent, or Firm* — Sheppard Mullin Richter & Hampton LLP

(57) ABSTRACT

Systems and methods are provided for reducing WAN bandwidth consumption used by multicast for large scale software-defined branch deployments. In particular, a cloud-based multicast orchestrator may be implemented as part of an SD-WAN service. This cloud-based multicast orchestrator may orchestrate routes for multicast traffic between a multicast source and the various branches of the large scale software-defined branch deployment. This cloud-based multicast orchestrator may orchestrate routes for multicast traffic which reduce/optimize WAN bandwidth consumption. In combination with the cloud-based multicast orchestrator, examples may utilize a branch gateway hierarchy which designates one branch gateway a "leader" for a given multicast stream to further reduce WAN bandwidth consumption used by multicast.

15 Claims, 8 Drawing Sheets

(51) Int. Cl.
*H04L 12/46* (2006.01)
*H04L 12/66* (2006.01)

(58) Field of Classification Search
USPC .......................................................... 709/223
See application file for complete search history.

(56) References Cited

U.S. PATENT DOCUMENTS

| | | | |
|---|---|---|---|
| 8,953,446 B1* | 2/2015 | Wang | H04L 12/4641 370/231 |
| 10,104,139 B2 | 10/2018 | Kebler | |
| 2006/0187950 A1 | 8/2006 | Bou-Diab | |
| 2010/0177752 A1* | 7/2010 | Aggarwal | H04W 8/082 370/338 |
| 2012/0278898 A1* | 11/2012 | Nguyen | H04L 63/107 726/27 |
| 2013/0058336 A1* | 3/2013 | Wadhwa | H04L 9/40 370/390 |
| 2016/0301724 A1* | 10/2016 | Kodaypak | H04L 43/0817 |
| 2016/0380919 A1* | 12/2016 | Wang | H04L 65/611 370/312 |
| 2017/0289216 A1* | 10/2017 | N | H04L 45/22 |
| 2018/0191515 A1* | 7/2018 | Vivekanandan | H04L 12/185 |
| 2019/0013966 A1* | 1/2019 | Nagarajan | H04L 45/28 |
| 2019/0123922 A1* | 4/2019 | Suthar | H04L 45/74 |
| 2020/0106687 A1 | 4/2020 | Nambisan | |
| 2020/0351182 A1* | 11/2020 | Hegde | G06F 16/285 |
| 2020/0366594 A1 | 11/2020 | Kaplan | |
| 2021/0073103 A1* | 3/2021 | Ross | G06F 16/9027 |
| 2021/0352045 A1* | 11/2021 | Kodavanty | H04L 61/5076 |
| 2022/0217015 A1* | 7/2022 | Vuggrala | H04L 41/5019 |

* cited by examiner

MULTICAST WAN OPTIMIZATION IN LARGE SCALE BRANCH DEPLOYMENTS USING A CENTRAL CLOUD-BASED SERVICE

BACKGROUND

In computer networking, multicast (or a multicast stream) may generally refer to group communication where data transmission is addressed to a group of interested receivers (e.g. destination hosts/computers) simultaneously. Multicast may be used for various purposes such as streaming media and other network applications, information dissemination, group communication, etc.

Associated with multicast is the concept of a multicast group. A multicast group will typically have an IP address (i.e. the multicast group IP address) which identifies the multicast group. Members of the multicast group may join or leave the multicast group without reference to other members. Traffic sent by a member of a multicast group may be received by all the other members of the multicast group (e.g. receivers). Traditionally, multicast traffic is routed to multicast group members using IP routing protocols such as Protocol Independent Multicast (PIM).

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
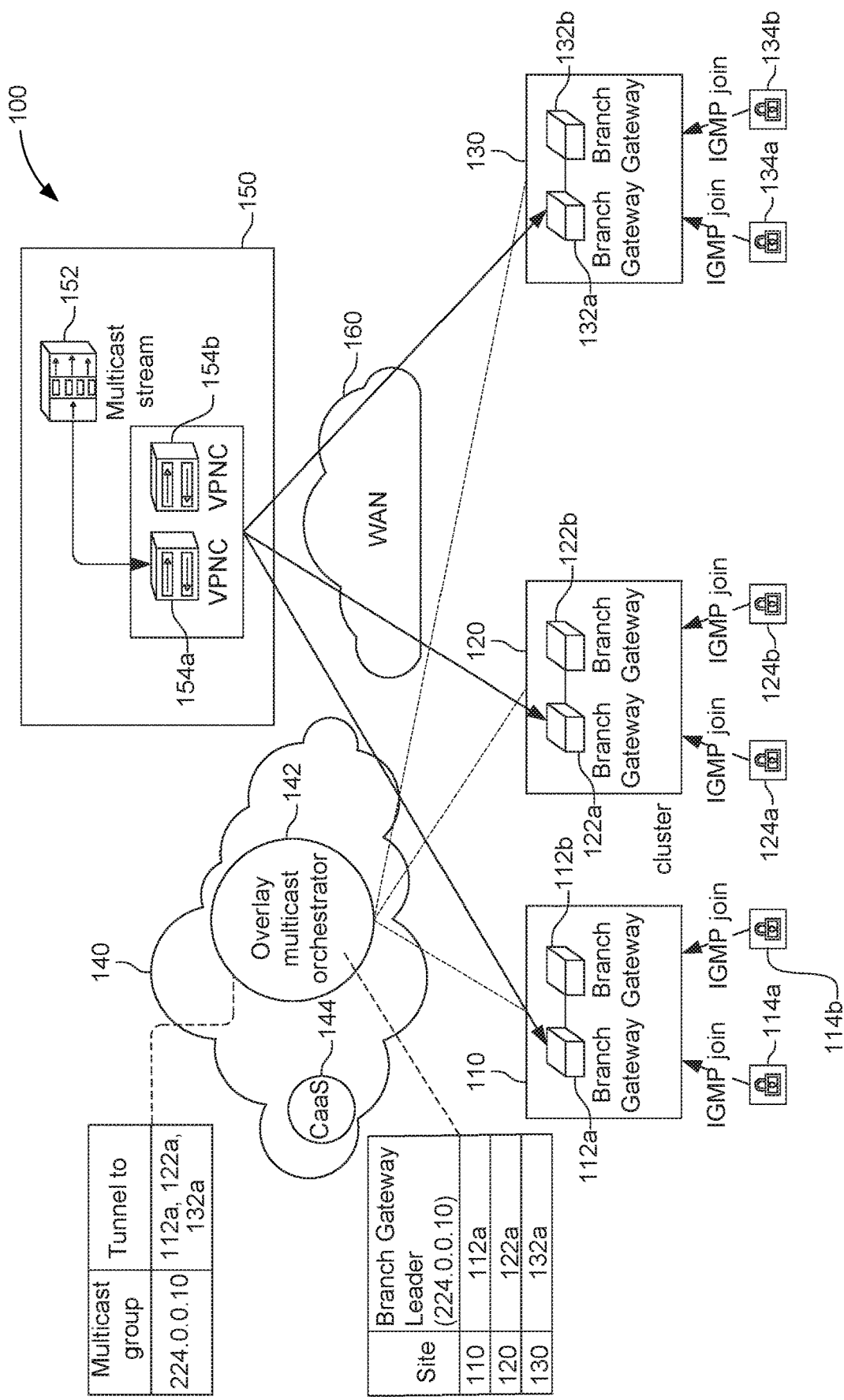
FIG. 1 depicts an example large scale software-defined branch deployment, in accordance with various examples of the presently disclosed technology.

The figures are not exhaustive and do not limit the present disclosure to the precise form disclosed.

DETAILED DESCRIPTION

As described above, multicast may refer to group communication where data transmission (i.e. multicast traffic) is addressed to a group of interested receivers (e.g. destination hosts/computers) simultaneously.

One environment for multicast is large scale software-defined branch deployments. In large scale software-defined branch deployments, software-defined WAN (SD-WAN) technology may be used to centralize management of an organization's wide area network (WAN) across multiple physical branch locations. Commonly implemented as a cloud-based management solution, SD-WAN technologies (e.g. HPE's Aruba SD-WAN) rely on virtualization, overlay networks, and onsite SD-WAN devices and software platforms to (among other things) better manage network traffic.

However, existing multicast implementations for large scale software-defined branch deployment have failed to take advantage of the centralized management capabilities of SD-WAN technologies. In particular, these implementations have relied on variations of the same traditional, decentralized approach—Protocol-Independent Multicast (PIM)— which has been widely for Internet-based multicast for years. While simple to implement, PIM based approaches do not optimize bandwidth consumption across the WAN of a large scale software-defined branch deployment. In particular, multicast traffic will be transmitted—over the WAN—from the multicast source to a given branch across all the branch gateways of the branch (as used herein, gateways may refer to network devices which transfer traffic between a branch's local area network (LAN), and the organization's larger WAN—branch gateways are generally multifold at a given branch for load balancing and redundancy purposes). Moreover, because there is no central entity coordinating/orchestrating routes between the multicast source and the various branches, PIM-based solutions can be difficult to monitor and troubleshoot. Also, due to a lack of centralized management, large amounts of multicast-related routing information must be broadcast to a wide array of network devices involved in the multicast transmission (e.g. source VPNCs, routers, gateways, etc.). Accordingly, PIM's decentralized and somewhat brute force approach (sometimes referred to as "flood and prune") can consume large, and unnecessary amounts of WAN bandwidth. This is particularly true in large scale software-defined branch deployments which include multiple (and sometimes many) gateways per branch.

Against this backdrop, examples of the presently disclosed technology leverage the centralized management capabilities of SD-WAN technologies to provide a new approach to multicast implementation which reduces WAN bandwidth consumption for large scale software-defined branch deployments. In particular, a cloud-based multicast orchestrator may be implemented as part of a SD-WAN package. This cloud-based multicast orchestrator may orchestrate routes for multicast traffic between a multicast source (commonly a data center) and the various branches of the large scale software-defined branch deployment. As will be described below, this cloud-based multicast orchestrator may orchestrate/calculate routes for multicast traffic which reduce WAN bandwidth consumption.

In addition to the cloud-based multicast orchestrator, examples of the presently disclosed technology feature a gateway hierarchy designed to further reduce WAN bandwidth consumption. In particular, at a given branch, one gateway will be designated as a "leader" for a given multicast stream (here, loads may be balanced by assigning different "leaders" at the given branch for different multicast streams/groups). The other gateways at the given branch will be designated as "secondary gateways" for the given multicast stream. Accordingly, only the gateway leader will (a)

communicate with the cloud-based multicast orchestrator; and (b) receive multicast traffic associated with the given multicast stream, from the multicast source. By this architecture, WAN bandwidth consumption may be reduced significantly. For example, if the given branch has four gateways and at least one host/user interested in the given multicast stream, existing technologies would replicate the multicast stream across four routes to the given branch (where each route would terminate at one of the four gateways). By contrast, examples of the presently disclosed technology would utilize the cloud-based multicast orchestrator to orchestrate a single route from the multicast source to the one gateway leader. Notwithstanding additional bandwidth savings/optimizations found by the cloud-based multicast orchestrator in calculating this route, the mere fact that the number of routes for multicast traffic has been reduced from four to one, saves a tremendous amount of WAN bandwidth.

As will be described in greater detail below, examples may also leverage existing SD-WAN services (e.g. Containers-as-a-Service offerings, route calculation engines, etc.) in order to enhance the aforementioned multicast orchestration. For example, CaaS-type services which are often included in an SD-WAN platform may be used to manage gateway clusters at each of the branches of a large scale software-defined branch deployment. Similarly, a CaaS may be used to manage VPNC clusters at the multicast source. These VPNCs may serve as nodes at the multicast source from which routes to the gateway leaders are orchestrated. Accordingly, the CaaS may convey important multicast route-related information to its neighbor in the SD-WAN platform—the multicast orchestrator. The CaaS may also make designations (e.g. gateway leader designations, assignment of VPNCs to multicast streams) which facilitate the architectures described herein.

FIG. 1 depicts an example large scale software-defined branch deployment, in accordance with various examples of the presently disclosed technology. Large scale software-defined branch deployment 100 includes three branches/customer sites (branches 110, 120, and 130), an SD-WAN 140, and a multicast source 150. Traffic may be carried between the branches, SD-WAN 140, and multicast source 150 via wide area network (WAN) 160.

Multicast Source 150: Multicast source 150 may be any source of a multicast stream. In common examples, multicast source 150 would be a datacenter. As depicted in the example figure, multicast stream 152 is behind two Virtual Private Network Clients (VPNCs): VPNCs 154a and 154b.

Multicast Stream 152: Multicast stream 152 may be any data transmission (e.g. streaming media, information dissemination, etc.) addressed to a group of interested receivers (e.g. hosts) simultaneously. A multicast stream may be associated with a multicast group. A multicast group may include as members (a) the source of the multicast, and (b) receivers of the multicast stream. As depicted, multicast stream 152 is associated with multicast group 224.0.0.010. Here, "224.0.0.010" may be an IP address for multicast group 224.0.0.010. Multicast group 224.0.0.010 may include various members which receive traffic associated with multicast stream 152. As will be described below, these group members/receivers may be hosts located at branches 110-130.

In the example of FIG. 1, only one multicast stream (i.e. multicast stream 152) is depicted in multicast source 150. However, in other examples multicast source 150 may include any number of multicast streams. Similarly, in various examples large scale software-defined branch deployment 100 may include any number of multicast sources.

VPNCs 154a and 154b: A given multicast stream may be associated with one VPNC. In general, a VPNC may refer to a hardware of software application used for connecting Virtual Private Networks (VPNs). As depicted, multicast source 150 includes two VPNCs: 154a and 154b. Together, these VPNCs may form a VPNC cluster. As will be described in greater detail below, a Containers-as-a-Service (CaaS) application which resides in SD-Wan 140 may manage this VPNC cluster. Management may include such tasks as configuring the VPNCs, designating which VPNC is associated with a given multicast stream, etc.

As depicted, multicast stream 152 is associated with VPNC 154a. Accordingly, VPNC 154a may be used to transmit multicast traffic associated with multicast stream 152 to one or more of branches 110-130 (as orchestrated by Overlay Multicast Orchestrator 142).

SD-WAN 140: SD-WAN 140 may be a cloud-based SD-WAN technology platform (e.g. HPE's Aruba SD-WAN) which includes a centralized service capable of orchestrating multicast-related traffic within a given WAN (e.g. WAN 160). In certain examples, SD-WAN 140 may include additional centralized network management services.

Accordingly, residing within SD-WAN 140 may be various sub-services. As depicted, SD-WAN 140 includes Overlay Multicast Orchestrator 142 and Containers-as-a-Service (CaaS) 144.

Overlay Multicast Orchestrator 142: Overlay Multicast Orchestrator 142 is a central management entity which orchestrates routes for multicast traffic between multicast source 150 and branches 110-130. In order to accomplish this task, Overlay Multicast Orchestrator 142 should understand aspects of network topology/configuration, as well as the needs of the network's hosts. Among other items, Overlay Multicast Orchestrator 142 may be aware of (1) which branches are interested in a given multicast stream, (2) among the branches interested in the given multicast stream, which branch gateways have been designated as branch gateway leaders for the given multicast stream, and (3) which VPNC and/or multicast source location is associated with the given multicast stream. Abreast of this information, Overlay Multicast Orchestrator 142 may then orchestrate routes between an appropriate VPNC and branch gateway leaders in order to transmit the multicast traffic to interested hosts. As a central management entity incorporated within SD-WAN 140, Overlay Multicast Orchestrator 142 may collect this information and make these determinations in a manner which reduces WAN bandwidth consumption. Said differently, centralized decision-making within Overlay Multicast Orchestrator 142 greatly reduces the number of communications/decisions required to transmit multicast traffic within a large scale software-defined branch deployment. As described above, under the decentralized approach used by existing technologies, much of the aforementioned information would be communicated among the various nodes (e.g. routers, branch gateways, VPNCs) of a network tasked with transmitting multicast traffic.

So how may Overlay Multicast Orchestrator 142 obtain all of this information? As will be described below, Overlay Multicast Orchestrator 142 may obtain certain network configuration/topology information from CaaS 144, and information related to the needs of the network's hosts from designated branch gateway leaders.

CaaS 144: CaaS 144, another central management service which resides in SD-WAN 140, may manage the various "containers/clusters" of large scale software-defined branch deployment 200. Containers-as-a-Service (CaaS) may refer to a cloud-based service which offers organizations a way to manage their virtualized applications, clusters, and containers. A CaaS may include a container orchestration engine that runs and maintains infrastructure between an organization's clusters. As described above, CaaS 144 may manage the VPNC cluster which contains VPNC 154*a* and 154*b*. As a part of its management responsibilities, CaaS 144 may determine (or at least be aware of) which VPNC is associated with a given multicast stream. Accordingly, CaaS 144 may provide this information to Overlay Multicast Orchestrator 142.

CaaS 144 may also manage clusters associated with branch gateways, which may be referred to as BG clusters. Within a given BG cluster, there will be will one leader. As will be described in greater detail below, only the leader of a given BG cluster will (a) send requests to join or leave a multicast group to Overlay Multicast Orchestrator 142; and (b) receive multicast traffic from one of the VPNCs which reside in multicast stream source 150. In certain examples, CaaS 144 may determine (or at least be aware of) which branch gateway of a given BG cluster is the leader for a given multicast stream/multicast group. In various examples, CaaS 144 may balance loads by assigning different leaders within the BG cluster for different multicast streams—i.e. one leader for multicast stream 152, another leader for a different multicast stream, etc. CaaS 144 can also manage the configuration of the branch gateways of a given BG cluster to ensure that each branch gateway is aware of which branch gateway is the leader for a given multicast stream. CaaS 144 may communicate all of this information to Overlay Multicast Orchestrator 142 as needed.

Here, it may be noted that CaaS-type services are often included in an SD-WAN service, such as SD-Wan 140. Why does this matter? By leveraging existing cloud-based service infrastructure and features, examples of the presently disclosed technology can enhance a multicast orchestration service without consuming significant additional WAN bandwidth, cloud resources, etc.

Overlay Multicast Orchestrator 142 (continued): As described above, from CaaS 144, Overlay Multicast Orchestrator 142 may obtain information associated with (a) which VPNC and/or multicast source location is associated with a given multicast stream; and (b) which branch gateways have been designated leaders for the given multicast stream. Still missing however is the information related to which branches are interested in the given multicast stream. As described above, Overlay Multicast Orchestrator 142 may obtain this information from branch gateway leaders for the given multicast stream. In particular, Overlay Multicast Orchestrator 142 may receive "join request" messages from branch gateway leaders.

As described above, each branch will have a designated branch gateway leader for a given multicast stream. For multicast stream 152, branch gateways 112*a*, 122*a*, and 132*a* are the designated branch gateway leaders for branches 110, 120, and 130 respectively. Via mechanisms that will be described in greater detail below, these branch gateway leaders may receive join requests from hosts or other branch gateways at their branch. If a branch gateway leader receives at least one join request for multicast stream 152, the branch gateway leader will send a join request message to Overlay Multicast Orchestrator 142. The join request message may be sent to Overlay Multicast Orchestrator 142 using various protocols such as Websocket, grpc, etc.

Overlay Multicast Orchestrator 142 may now be aware of (1) which branches are interested in a given multicast stream, (2) among the branches interested in the multicast stream, which branch gateways have been designated leaders for the given multicast stream, and (3) which VPNC and/or multicast source location is associated with the given multicast stream. Accordingly, Overlay Multicast Orchestrator 142 may orchestrate routes between the appropriate VPNC and branch gateway leaders for the given multicast stream. As an illustrative example, if hosts at branches 110, 120 and 130 are all interested in multicast stream 152, Overlay Multicast Orchestrator 142 may orchestrate: one route between VPNC 154*a* and branch gateway 112*a*; one route between VPNC 154*a* and branch gateway 122*a*; and one route between VPNC 154*a* and branch gateway 132*a*.

In some examples, a route computation engine in Overlay Multicast Orchestrator 142 may calculate routes for multicast traffic based on the aforementioned source information (i.e. which VPNC is associated with a given multicast stream) and receiver information (which branch gateways are designated leaders for the given multicast stream). In certain of these examples, the route computation engine may learn to calculate optimal routes for reducing bandwidth consumption for WAN 160. For example, Overlay Multicast Orchestrator 142 may employ artificial intelligence (AI) or machine learning to determine overlay tunnels for multicast traffic between VPNCs and branch gateways based on traffic requirements and historical data.

In other examples, Overlay Multicast Orchestrator 142 may take advantage of routes which have already been calculated by SD-WAN 140 (and/or its subservices). Existing SD-WAN services typically calculate routes for unicast traffic between VPNCs and branch gateways. Accordingly, Overlay Multicast Orchestrator 142 orchestrator may orchestrate multicast traffic through these pre-calculated routes. By leveraging existing SD-WAN knowledge and services, Overlay Multicast Orchestrator 142 can enhance its multicast orchestration service without consuming significant additional WAN bandwidth, cloud resources, etc.

In certain examples, Overlay Multicast Orchestrator 142 may utilize the overlay network of large scale software-defined branch deployment 200 to route multicast traffic between multicast source 150 and branches 110-130. In a given network, the underlay (or underlay network) may refer to the physical connections of the network (e.g. Ethernet). By contrast, the overlay (or overlay network) may refer to a logical network which uses virtualization to build connectivity on top of the physical infrastructure of the network using tunneling encapsulation. In other words, "overlay tunnels" may refer to virtual links which connect nodes of a network. Here, overlay tunnels may connect VPNCs and branch gateways. Various protocols such as IPSec and GRE may be used to transmit network traffic through these overlay tunnels. In general, SD-WAN architectures like the one depicted may rely on overlay tunnels to connect the various branches and other nodes of their network.

Branches 110, 120, and 130: As used herein, a branch may refer to a physical location at which one or more hosts (e.g. a computer or other network device associated with a user) may connect to WAN 160. For example a branch may be a remote office of an organization, a café/coffee shop, a home office, etc. While only three branches are depicted in the example figure, large scale software-defined branch deployment 100 may include any number of branches. In certain examples, these may be branches of a particular organization. In other examples branches may not all be associated with a single organization.

While not depicted, each branch may have its own local area network (LAN). The various network devices (e.g. hosts, branch gateways, routers, etc.) of a given branch may communicate with each other over the branch's LAN.

Hosts: A host may be a network device (e.g. a computer, tablet, smartphone, etc.) associated with a user located at a branch. A branch may have any number of hosts, but as depicted, each branch in large scale software-defined branch deployment 100 has two hosts. As described above, a host may be a receiver of multicast traffic. Said differently, a host may be a member of a multicast group. For example, hosts 114a and 124b may be members of multicast group 224.0.0.10. Accordingly, hosts 114a and 124b may receive multicast traffic associated with multicast stream 152 (the precise mechanisms by which multicast traffic is transmitted to hosts 114a and 124b will be described in greater detail below).

If a host is interested in a multicast stream, but is not already a member of the multicast group associated with the multicast stream, the host may send a message to a branch gateway. A given host may be connected to (i.e. "behind") one branch gateway (here, any number of hosts may be behind the branch gateway). As described above, multiple branch gateways may be deployed at a branch for load balancing and redundancy purposes. Accordingly, a given host may connect with a given branch gateway based on factors such as path latency. As depicted, host 114a is behind branch gateway 112a; host 114b is behind branch gateway 112b; host 124a is behind branch gateway 122a; host 124b is behind branch gateway 122b; etc.

If a host is not yet a member of a multicast group, but is interested in joining, the host may send a message to the branch gateway it is behind. In certain examples, this may involve the host sending a "join request" message to the branch gateway. For example, host 134b may not yet be a member of multicast group 224.0.0.10, but may be interested in joining. Accordingly, host 134b may send a join request message to branch gateway 132b. In certain examples, this join request message may be sent using an IGMP protocol (i.e. an IGMP join request message). In some examples, a host may send an IGMP join request message to a branch gateway over a branch's LAN.

In the same/similar manner, if a host wants to leave a multicast group, the host may send a "leave request" message to the branch gateway it is behind. For example, if host 114a wants to leave multicast group 224.0.0.10, host 114a may send a leave request message branch gateway 112a.

Branch Gateways: A branch gateway may refer to a network device (hardware or software) which transfers traffic between a branch and other networks. For example, the branch gateways depicted in the example figure may transfer traffic between WAN 160 and the various network devices of their branch (e.g. other branch gateways, hosts, etc.).

There will typically be multiple branch gateways per branch (which may be referred to collectively as a BG cluster). However, for a given multicast stream, there will be one branch gateway leader per BG cluster. As described above, CaaS 144 may determine which branch gateway of a given BG cluster is the leader for a given multicast stream/multicast group. CaaS 144 can also manage the configuration of the branch gateways of a given BG cluster to ensure that each branch gateway is aware of which branch gateway of the BG cluster is the leader for a given multicast stream.

As a reminder from above, examples realize significant WAN bandwidth consumption savings simply by routing multicast traffic to a single "branch gateway leader" per branch. This is compared to existing technologies (e.g. PIM) which replicate multicast traffic across all the branch gateways of a given branch for a large scale software-defined branch deployment.

For multicast stream 152, branch gateways 112a, 122a, and 132a are the branch gateway leaders for their respective BG clusters. The other branch gateways (i.e. branch gateways 112b, 122b, and 132b) may be referred to as secondary branch gateways for multicast stream 152.

As described above, the branch gateway leader will be the only branch gateway at the branch which (a) sends join/leave request messages to Overlay Multicast Orchestrator 142 for multicast stream 152; and (b) receives multicast traffic from VPNC 154a associated with multicast stream 152.

However, both branch gateway leaders and secondary branch gateways may receive requests from hosts to join/leave multicast group 224.0.0.10 (as described above, a given host may be behind either a branch gateway leader or a secondary branch gateway). Similarly, both branch gateway leaders and secondary branch gateways may forward multicast traffic associated with multicast stream 152 to the hosts who have joined the multicast group 224.0.0.10. Accordingly, internal forwarding of join/leave requests and multicast traffic may be required between branch gateways.

Forwarding of Join/Leave Request Messages: When a secondary branch gateway receives a join/leave request message from a host, the secondary branch gateway may forward that message to the branch gateway leader. For example, if branch gateway 132b receives a message from host 134b requesting to join multicast group 224.0.0.10, branch gateway 132b may forward that message to branch gateway 132a (as described above, branch gateway 132a may then communicate that message to Overlay Multicast Orchestrator 142). In the same/similar manner, if branch gateway 122b receives a message from host 124b requesting to leave multicast group 224.0.0.10, branch gateway 122b may forward that message to branch gateway 122a. In certain examples, the message forwarding between branch gateways may be carried over the LAN of a branch.

When a branch gateway leader receives a join/leave request message from a host, internal forwarding of the join/leave request message may not be required. For example, if branch gateway 132a receives a message from host 134a requesting to join multicast group 224.0.0.10, branch gateway 132a would not need to forward that message to another branch gateway within branch 130. Instead, as branch gateway leader, branch gateway 132a may communicate that message directly to Overlay Multicast Orchestrator 142.

Forwarding of Multicast Traffic: When a branch gateway leader receives multicast traffic from VPNC 154a, the branch gateway may forward the multicast traffic to (a) an interested host behind the branch gateway leader, or (b) a secondary branch gateway in front of an interested host. For example, branch gateway 112a may receive multicast traffic associated with multicast stream 152 from VPNC 154a (as orchestrated by Overlay Multicast Orchestrator 142). Both hosts 114a and 114b may be interested in multicast stream 152 (i.e. they both may be members of multicast group 224.0.0.10). Accordingly, branch gateway 112a may forward the multicast traffic to host 114a directly because host 114a is behind branch gateway 112a. By contrast, in order to forward the multicast traffic to host 114b, branch gateway 112a must forward the multicast traffic to branch gateway 112b as host 114b is behind branch gateway 112b.

Figure 2:
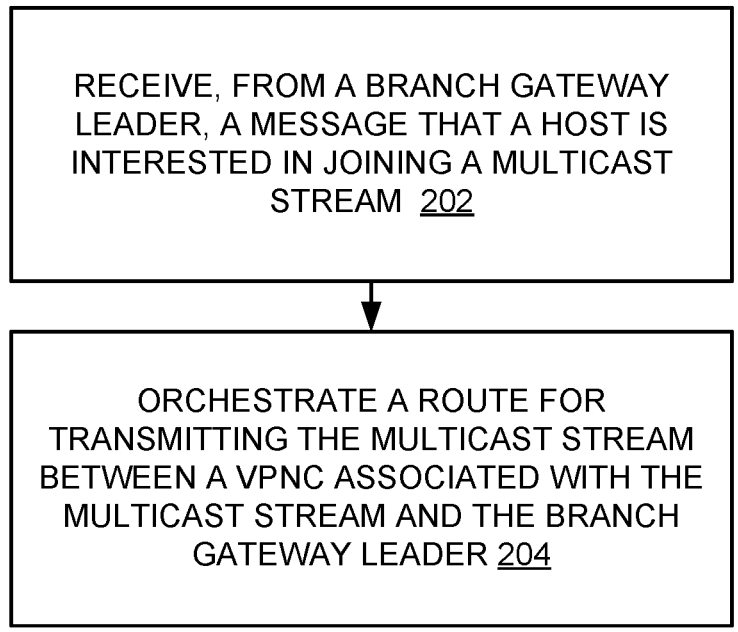
FIG. 2 is an example flowchart illustrating example operations that can be performed by a cloud-based multicast orchestrator to orchestrate multicast traffic within a large scale software-defined branch deployment, in accordance with various examples.
Figure 3:
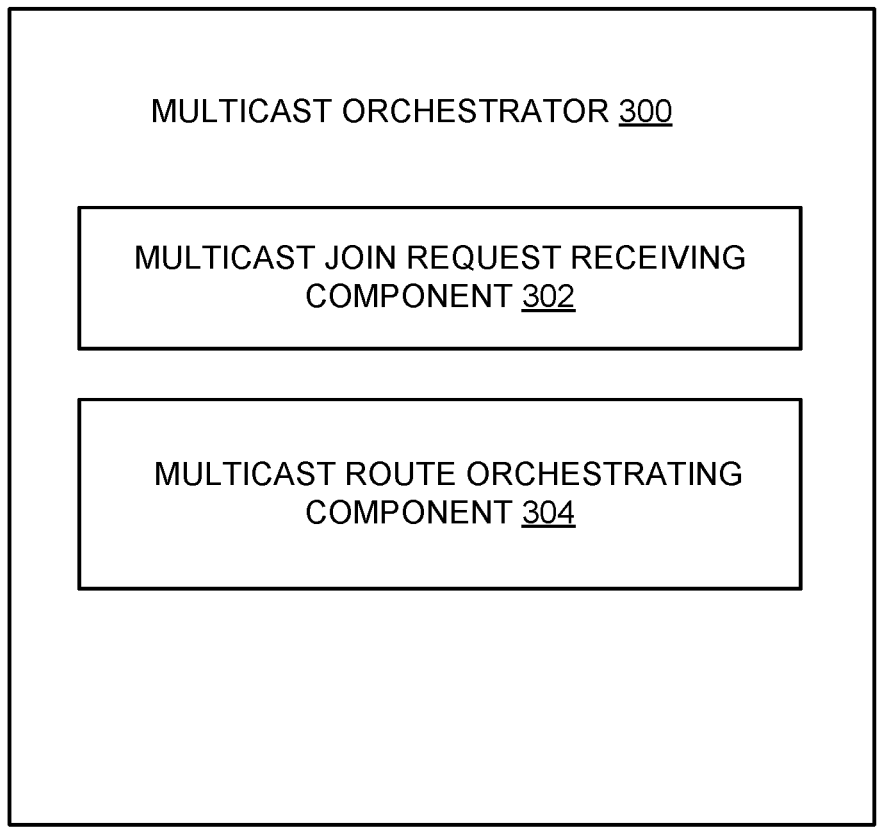
FIG. 3 is an example system diagram illustrating components of the cloud-based multicast orchestrator of FIG. 2, in accordance with various examples.

FIG. 2 is an example flowchart illustrating example operations that can be performed by a cloud-based multicast orchestrator to orchestrate multicast traffic within a large scale software-defined branch deployment, in accordance with various examples. As a companion to FIG. 2, FIG. 3 is an example system diagram illustrating components of a cloud-based multicast orchestrator, in accordance with various examples.

At step 202, the cloud-based multicast orchestrator may receive, from a branch gateway leader of a first customer site, a message that one or more hosts at the first customer site are interested in joining a multicast stream. In various examples, this step may be performed by multicast join request receiving component 302 of multicast orchestrator 300.

The first customer site (i.e. branch) may be one of multiple customer sites which make up a large scale software-defined branch deployment connected by a wide area network (WAN). In large scale software-defined branch deployments, software-defined WAN (SD-WAN) technology may be used to manage a WAN across multiple customer sites. In many examples, SD-WAN technology is implemented as a cloud-based service.

The cloud-based multicast orchestrator may be piece of hardware or software which orchestrates routes for multicast traffic between a source of the multicast stream and the branch gateway leader. In certain examples, the cloud-based multicast orchestrator may be implemented as part of an SD-WAN service (e.g. HPE's Aruba SD-WAN) which manages a WAN that the first customer site is a part of.

The multicast stream may be any data transmission (e.g. streaming media, information dissemination, etc.) addressed to a group of interested receivers (e.g. hosts) simultaneously. In certain examples, a multicast stream may be associated with a multicast group. A multicast group may include as members (a) the source of the multicast stream, and (b) receivers of the multicast stream (e.g. hosts).

A host may refer to a network device (e.g. a computer, tablet, smartphone, etc.) associated with a user located at a customer site. For example, a host may be a user's work computer or smartphone. As described above, a host may be a receiver of the multicast stream. Said differently, a host may be a member of a multicast group associated with the multicast stream.

If a host is interested in the multicast stream, but is not already a member of the multicast stream/group, the host may send a message to a branch gateway located at a customer site. A given host may be connected to (i.e. behind) a particular branch gateway. As described above, multiple branch gateways may be deployed at the first customer site for load balancing and redundancy purposes. Accordingly, a given host of the first customer site may connect with a given branch gateway at the first customer site based on factors such as path latency.

A branch gateway may refer to a network device (hardware or software) which transfers traffic between a customer site and other networks. As described above, the first customer site may include multiple branch gateways. However, for the multicast stream, there will be one branch gateway leader at the first customer site. The branch gateway leader at the first customer site will be the only branch gateway at the first customer site which (a) sends messages, to the cloud-based multicast orchestrator, that one or more hosts at the first customer site are interested in joining a multicast stream; and (b) receives multicast traffic associated with the multicast stream from a VPNC associated with the multicast stream/multicast stream source.

Certain branch gateways at the first customer site will be secondary branch gateways (i.e. branch gateways which are not the leader). Like the branch gateway leader, the secondary branch gateways may receive, from one or more hosts of the first customer site, requests to join or leave a multicast group/stream. Similarly, both branch gateway leaders and secondary branch gateways may forward multicast traffic associated with the multicast stream to the hosts who have joined the multicast group/stream.

As described above, the first customer site may be one of multiple customer sites of a large scale software-defined branch deployment connected by a WAN and the cloud-based multicast orchestrator may be implemented as part of an SD-WAN platform which manages the WAN. Accordingly, the cloud-based multicast orchestrator may receive, via the WAN, the message that one or more hosts at the first customer site are interested in joining a multicast stream. The message itself may be sent using various protocols such as Websocket, grpc, etc.

At step 204, the cloud-based multicast orchestrator may orchestrate a route for transmitting the multicast stream between a VPNC associated with the multicast stream and the branch gateway leader at the first customer site. In various examples, this step may be performed by multicast route orchestrating component 304 of multicast orchestrator 300.

A VPNC may refer to a hardware of software application used for connecting Virtual Private Networks (VPNs). Here, the VPNC associated with the multicast stream may be used to connect a source of the multicast stream (e.g. a datacenter) with the branch gateway leader at the first customer site. Accordingly, multicast traffic associated with the multicast stream may be transmitted over this connection. In certain examples, the VPNC associated with the multicast stream may be located at the source of the multicast stream.

In some examples, the cloud-based multicast orchestrator may calculate routes for multicast traffic based on source information (i.e. information related to the VPNC associated with the multicast stream) and receiver information (i.e. information related to the branch gateway leader). In certain examples, the cloud-based multicast orchestrator may learn to calculate routes which reduce bandwidth consumption for a WAN network. In various examples, the cloud-based multicast orchestrator may employ artificial intelligence (AI) or machine learning in order to calculate the routes which reduces WAN bandwidth consumption. Once calculated, the cloud-based multicast orchestrator may orchestrate multicast traffic through these routes.

In other examples, the cloud-based multicast orchestrator may take advantage of routes which have already been calculated by the SD-WAN service that the cloud-based multicast orchestrator is a part of. As described above, existing SD-WAN services typically calculate routes for unicast traffic between VPNCs and branch gateways. Accordingly, the cloud-based multicast orchestrator may determine to orchestrate multicast traffic through these pre-calculated routes. By leveraging existing SD-WAN knowledge and services, the cloud-based multicast orchestrator can enhance its multicast orchestration service without consuming significant additional WAN bandwidth, cloud resources, etc.

In certain examples, the cloud-based multicast orchestrator may utilize the overlay network of a WAN when orchestrating routes for multicast traffic. In a given network, the underlay (or underlay network) may refer to the physical connections of the network (e.g. Ethernet). By contrast, the overlay (or overlay network) may refer to a logical network which uses virtualization to build connectivity on top of the physical infrastructure of the network using tunneling encapsulation. In other words, "overlay tunnels" may refer to virtual links which connect nodes of a network. Here, overlay tunnels may connect VPNCs and branch gateways. Various protocols such as IPSec and GRE may be used to transmit network traffic through these overlay tunnels. In general, SD-WAN technologies—into which the cloud-based multicast orchestrator may be incorporated—often use overlay networks tunnels to connect the various branches and other nodes of their WAN.

As will be described in conjunction with FIGS. 4-7, once multicast traffic has been transmitted to the branch gateway leaders through the routes orchestrated by the cloud-based multicast orchestrator, the multicast traffic may be forwarded to the various hosts interested in the multicast.

As an additional note, in various examples, the cloud-based multicast orchestrator may also receive join request messages from branch gateway leaders at other customer sites (e.g. a second customer site). Accordingly, in the same/similar manner as described above, the cloud-based multicast orchestrator may orchestrate routes for transmitting multicast traffic to these branch gateway leaders at other customer sites.

Figure 4:
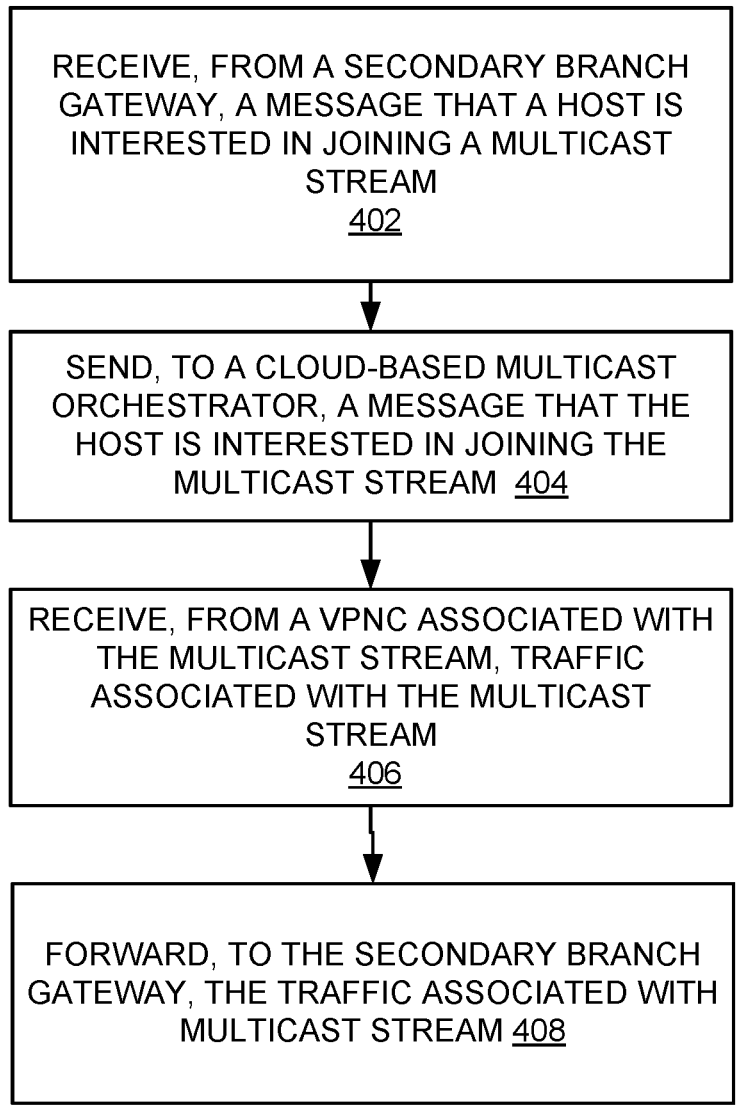
FIG. 4 is an example flowchart illustrating example operations that can be performed by a branch gateway leader to reduce WAN bandwidth consumption for multicast transmission in large scale software-defined branch deployments, in accordance with various examples.
Figure 5:
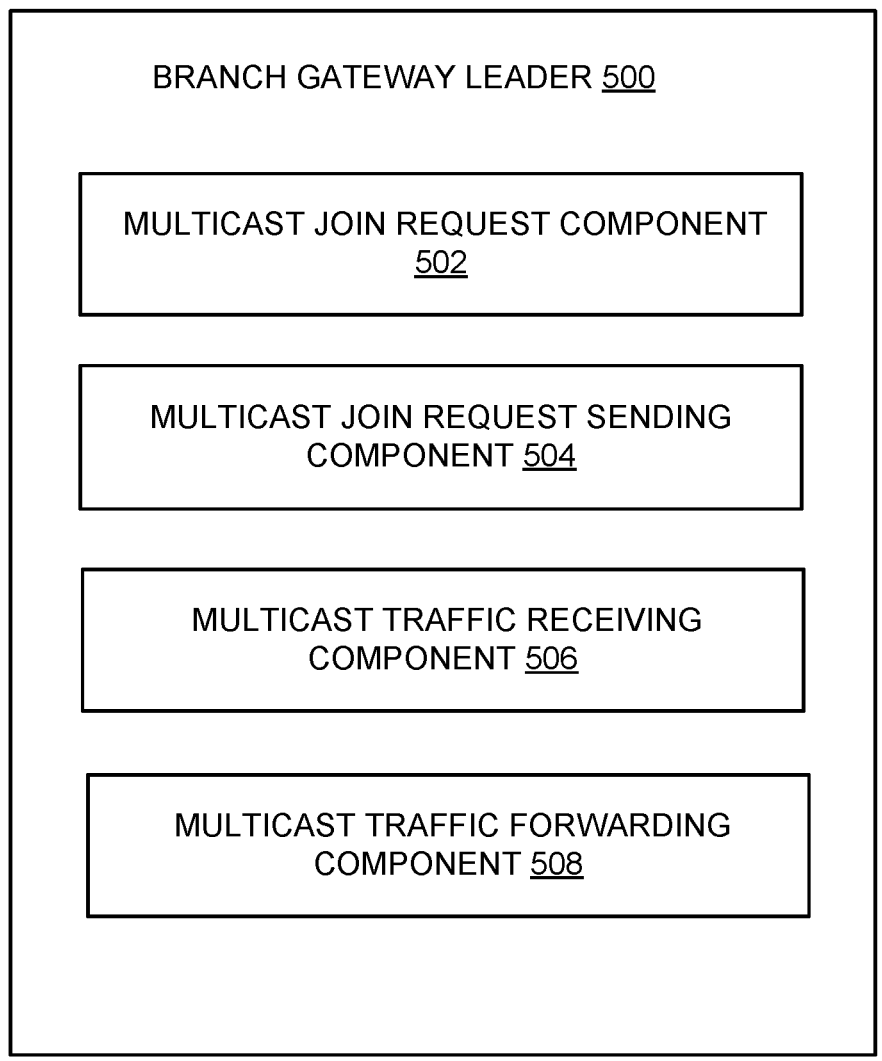
FIG. 5 is an example system diagram illustrating components of the branch gateway leader of FIG. 4, in accordance with various examples.

FIG. 4 is an example flowchart illustrating example operations that can be performed by a branch gateway leader of a customer site to reduce WAN bandwidth consumption for multicast transmission in large scale software-defined branch deployments, in accordance with various examples. As a companion to FIG. 4, FIG. 5 is an example system diagram illustrating components of a branch gateway leader, in accordance with various examples.

At step 402, the branch gateway leader of the customer site may receive, from one or more secondary branch gateways of the customer site, one or more messages that one or more hosts at the customer site are interested in joining a multicast stream. In various examples, step 402 may be performed by multicast join request receiving component 502 of branch gateway leader 500.

As described in conjunction with FIGS. 2-3, the customer site may be one of multiple customer sites which make up a large scale software-defined branch deployment connected by a WAN. In large scale software-defined branch deployments, SD-WAN technology may be used to manage a WAN across multiple customer sites. In many examples, SD-WAN technology is implemented as a cloud-based service.

The multicast stream may be any data transmission (e.g. streaming media, information dissemination, etc.) addressed to a group of interested receivers (e.g. hosts) simultaneously. In certain examples, a multicast stream may be associated with a multicast group. A multicast group may include as members (a) the source of the multicast stream, and (b) receivers of the multicast stream (e.g. hosts).

A branch gateway may refer to a network device (hardware or software) which transfers traffic between the customer site and other networks. As described above, the customer site may include multiple branch gateways. However, for the multicast stream, there will be one branch gateway leader at the customer site. The branch gateway leader will be the only branch gateway at the customer site which (a) sends messages, to the cloud-based multicast orchestrator, that one or more hosts at the customer site are interested in joining a multicast stream; and (b) receives multicast traffic associated with the multicast stream from a VPNC associated with the multicast stream.

Certain branch gateways at the customer site will be secondary branch gateways (i.e. branch gateways which are not the leader). Like the branch gateway leader, secondary branch gateways may receive, from one or more hosts of the customer site, requests to join or leave a multicast group/stream (here, a given host may be connected to a secondary branch gateway for path latency/load balancing purposes). Similarly, both branch gateway leaders and secondary branch gateways may forward multicast traffic associated with the multicast stream to the hosts who have joined the multicast group/stream. However, because only the branch gateway leader (a) sends messages, to the cloud-based multicast orchestrator, that one or more hosts at the customer site are interested in joining a multicast stream; and (b) receives multicast traffic associated with the multicast stream from a VPNC—internal forwarding of join/leave requests and multicast traffic may be required between branch gateways of the customer site.

For this reason, the branch gateway leader may receive, from one or more secondary branch gateways of the customer site, one or more messages that one or more hosts at the customer site are interested in joining the multicast stream.

As described above, the various network devices of a customer site (e.g. branch gateways, hosts, routers, etc.) may be connected over a local area network (LAN). Accordingly, communications between branch gateways at the customer site may be carried over the customer site's LAN using various protocols.

At step 404, the branch gateway leader at the customer site may send, to a cloud-based multicast orchestrator, a message that one or more hosts at the customer site are interested in joining the multicast stream. In various examples, step 404 may be performed by multicast join request sending component 504 of branch gateway leader 500.

As described in conjunction with FIGS. 2-3, the cloud-based multicast orchestrator may be piece of hardware or software which orchestrates routes for multicast traffic between a source of the multicast stream and the branch gateway leader. In certain examples, the cloud-based multicast orchestrator may be implemented as part of an SD-WAN service (e.g. HPE's Aruba SD-WAN) which manages the WAN that the customer site is a part of.

Accordingly, communication between the branch gateway leader and the cloud-based multicast orchestrator may be carried over the WAN/large scale software-defined branch deployment the customer site is a part of. Communications between the branch gateway leader and the cloud-based multicast orchestrator may be sent using various protocols such as Websocket, grpc, etc.

At step 406, the branch gateway leader at the customer site may receive, from a VPNC associated with the multicast stream, traffic associated with the multicast stream. In various examples, step 406 may be performed by multicast traffic receiving component 506 of branch gateway leader 500.

As described in conjunction with FIGS. 2-3, a VPNC may refer to a hardware of software application used for connecting Virtual Private Networks (VPNs). Here, the VPNC associated with the multicast stream may be used to connect a source of the multicast stream with the branch gateway leader. Accordingly, multicast traffic associated with the multicast stream may be transmitted over this connection/route.

In certain examples, the route between the VPNC and the branch gateway leader may be implemented using an overlay network of the WAN/large scale software-defined branch deployment. As described above, the overlay (or overlay network) may refer to a logical network which uses virtualization to build connectivity on top of the physical infrastructure of the network using tunneling encapsulation. In other words, "overlay tunnels" may refer to virtual links which connect nodes of a network. Here, overlay tunnels may connect VPNCs and branch gateways. Various protocols such as IPSec and GRE may be used to transmit network traffic through these overlay tunnels. In general, SD-WAN technologies—into which the cloud-based multicast orchestrator may be incorporated—often use overlay networks tunnels to connect the various branches and other nodes of their WAN.

At step 408, the branch gateway leader at the customer site may forward, to the one or more secondary branch gateways of the customer site, the traffic associated with the multicast stream. In various examples, step 408 may be performed by multicast traffic forwarding component 508 of branch gateway leader 500.

As described above, because certain hosts interested in the multicast stream may be connected to (i.e. behind) secondary branch gateways, internal forwarding of multicast traffic between branch gateways of the customer site may be required. For this reason, the branch gateway leader at the customer site may need to forward the multicast traffic it receives from the VPNC, to one or more secondary branch gateways. Accordingly, once the secondary branch gateways receive the forwarded multicast traffic, they may forward the multicast traffic to the interested hosts they are connected to.

As described above, communications between branch gateways may be carried over the customer site's LAN using various protocols.

In various examples, the branch gateway leader may receive a request to join a multicast stream directly from a given host. In this scenario, no internal forwarding of the given host's join request would be required among the branch gateways because the branch gateway leader can communicate the given host's join request directly to the cloud-based multicast orchestrator. Similarly, when the branch gateway leader receives traffic associated with the multicast stream from the VPNC, the branch gateway leader can forward the multicast traffic directly to the given host.

Figure 6:
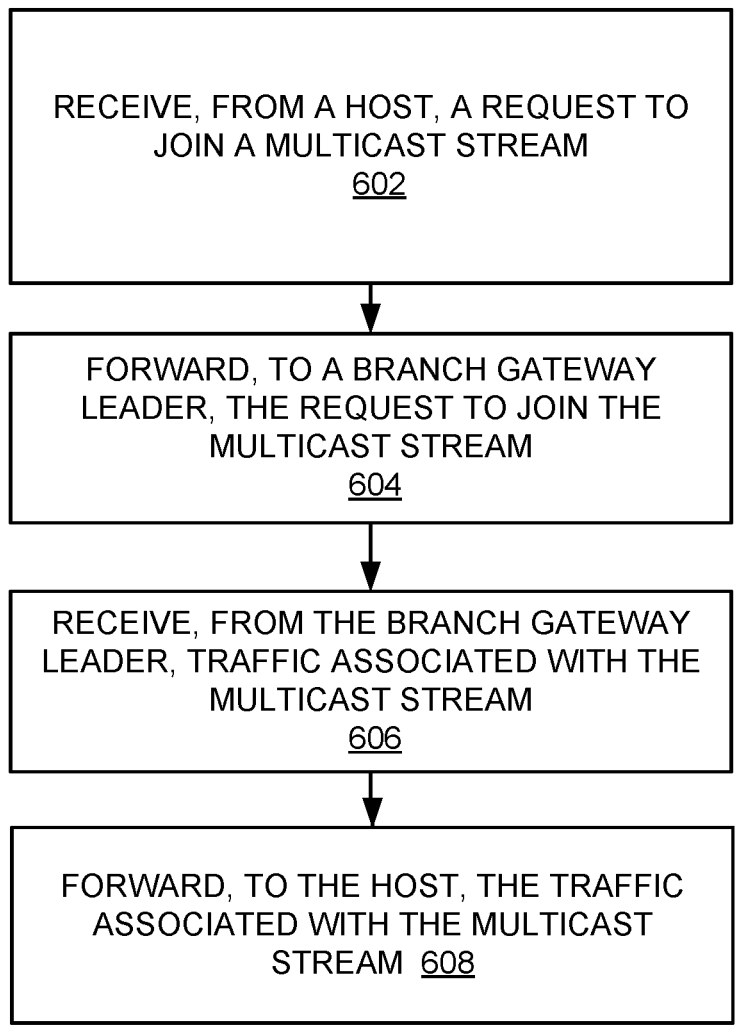
FIG. 6 is an example flowchart illustrating example operations that can be performed by a secondary branch gateway to reduce WAN bandwidth consumption for multicast transmission in large scale software-defined branch deployments, in accordance with various examples.
Figure 7:
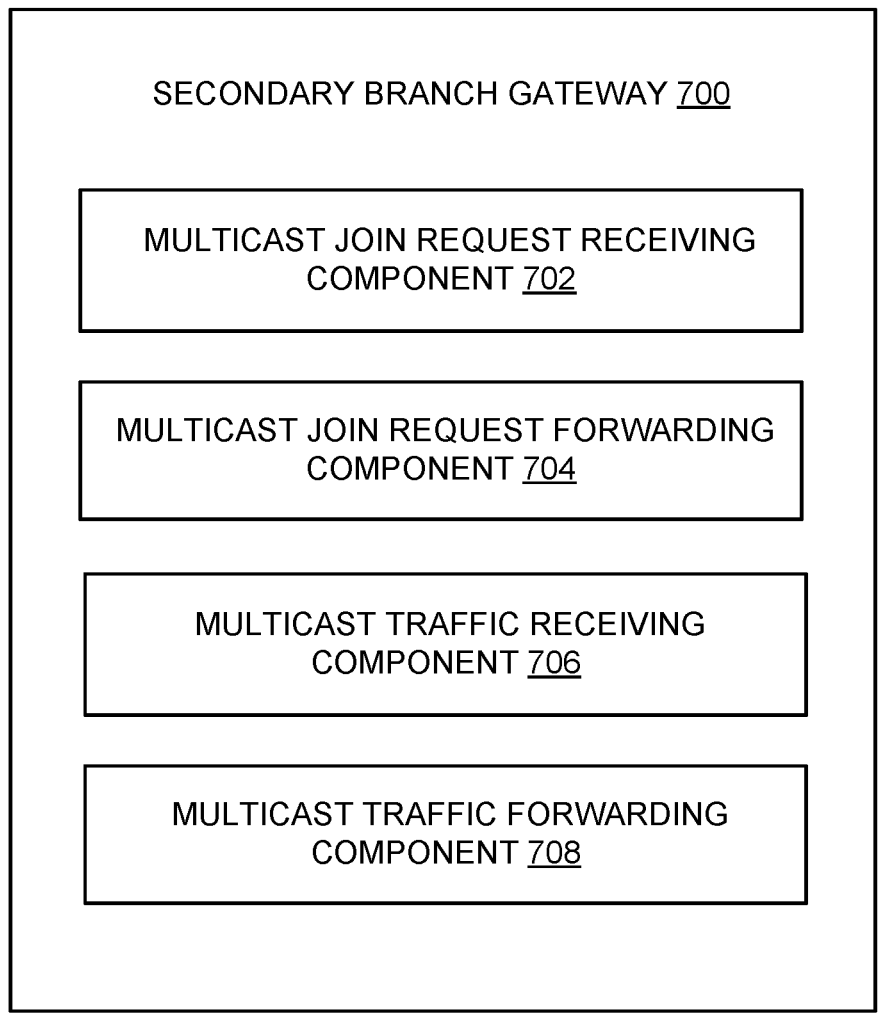
FIG. 7 is an example system diagram illustrating components of the secondary branch gateway of FIG. 6, in accordance with various examples.

FIG. 6 is an example flowchart illustrating example operations that can be performed by a secondary branch gateway of a customer site to reduce WAN bandwidth consumption for multicast transmission in large scale software-defined branch deployments, in accordance with various examples. As a companion to FIG. 6, FIG. 7 is an example system diagram illustrating components of a secondary branch gateway, in accordance with various examples.

At step 602, the secondary branch gateway may receive, from one or more hosts of the customer site, one or more requests to join a multicast stream. In various examples, step 602 may be performed by multicast join request receiving component 702 of secondary branch gateway 700.

As described above, the customer site may be one of multiple customer sites which make up a large scale software-defined branch deployment connected by a WAN. In large scale software-defined branch deployments, SD-WAN technology may be used to manage a WAN across multiple customer sites. In many examples, SD-WAN technology is implemented as a cloud-based service.

A multicast stream may be any data transmission (e.g. streaming media, information dissemination, etc.) addressed to a group of interested receivers (e.g. hosts) simultaneously.

In certain examples, a multicast stream may be associated with a multicast group. A multicast group may include as members (a) the source of the multicast stream, and (b) receivers of the multicast stream (e.g. hosts).

A host may refer to a network device (e.g. a computer, tablet, smartphone, etc.) associated with user located at the customer site. For example, a host may be a user's work computer or smartphone. As described above, a host may be a receiver of the multicast stream. Said differently, a host may be a member of a multicast group.

If a host is interested in the multicast stream/group, but is not already a member of the multicast stream/group, the host may send a message to a branch gateway located at the customer site. A given host may be connected to (i.e. behind) a particular branch gateway (here, any number of hosts may be behind the given branch gateway). As described above, multiple branch gateways may be deployed at the customer site for load balancing and redundancy purposes. Accordingly, a given host may connect with a given branch gateway based on factors such as path latency.

In certain examples, a host's request to join the multicast stream may be sent to a branch gateway using an Internet Group Management Protocol (IGMP) protocol (i.e. an IGMP join request message). In some examples, a host may send an IGMP join request message to a branch gateway over a branch's LAN.

A branch gateway may refer to a network device (hardware or software) which transfers traffic between the customer site and other networks. As described above, the customer site may include multiple branch gateways. However, for the multicast stream, there will be one branch gateway leader at the customer site. The branch gateway leader will be the only branch gateway at the customer site which (a) sends messages to a cloud-based multicast orchestrator; and (b) receives multicast traffic associated with the multicast stream from a VPNC.

The branch gateways which are not the branch gateway leader may be referred to as secondary branch gateways. Like the branch gateway leader, the secondary branch gateways may receive, from one or more hosts of the customer site, requests to join or leave a multicast group/stream. Similarly, both branch gateway leaders and the secondary branch gateways may forward multicast traffic associated with the multicast stream to the hosts who have joined the multicast group/stream. However, because only the branch gateway leader (a) sends messages to the cloud-based multicast orchestrator; and (b) receives multicast traffic associated with the multicast stream from a VPNC— internal forwarding of multicast traffic between branch gateways of the customer site may be required.

For this reason, at step 604 the secondary branch gateway may forward, to a branch gateway leader, the one or more requests to join the multicast stream. As described above, communications between branch gateways may be carried over the customer site's LAN using various protocols. In various examples, step 604 may be performed by multicast join request forwarding component 704 of secondary branch gateway 700.

At step 606, the secondary branch gateway may receive, from the branch gateway leader, traffic associated with the multicast stream. In various examples, step 604 may be performed by multicast traffic receiving component 706 of secondary branch gateway 700.

As described above, because certain hosts interested in the multicast stream may be behind secondary branch gateways, internal forwarding of multicast traffic between branch gateways of the customer site may be required. For this reason, the branch gateway leader at the customer site may need to forward the multicast traffic it receives from the VPNC, to one or more secondary branch gateways. Once the secondary branch gateways receive the forwarded multicast traffic, they may forward the multicast traffic to the hosts they are connected to.

Accordingly, at step 608 the secondary branch gateway may forward, to the one or more hosts of the customer site, the traffic associated with the multicast stream. In various examples, step 608 may be performed by multicast traffic forwarding component 708 of secondary branch gateway 700.

As described above, the secondary branch gateway at the customer site may use various protocols, including IGMP to transmit the traffic associated with the multicast stream to the one or more hosts of the customer site.

Figure 8:
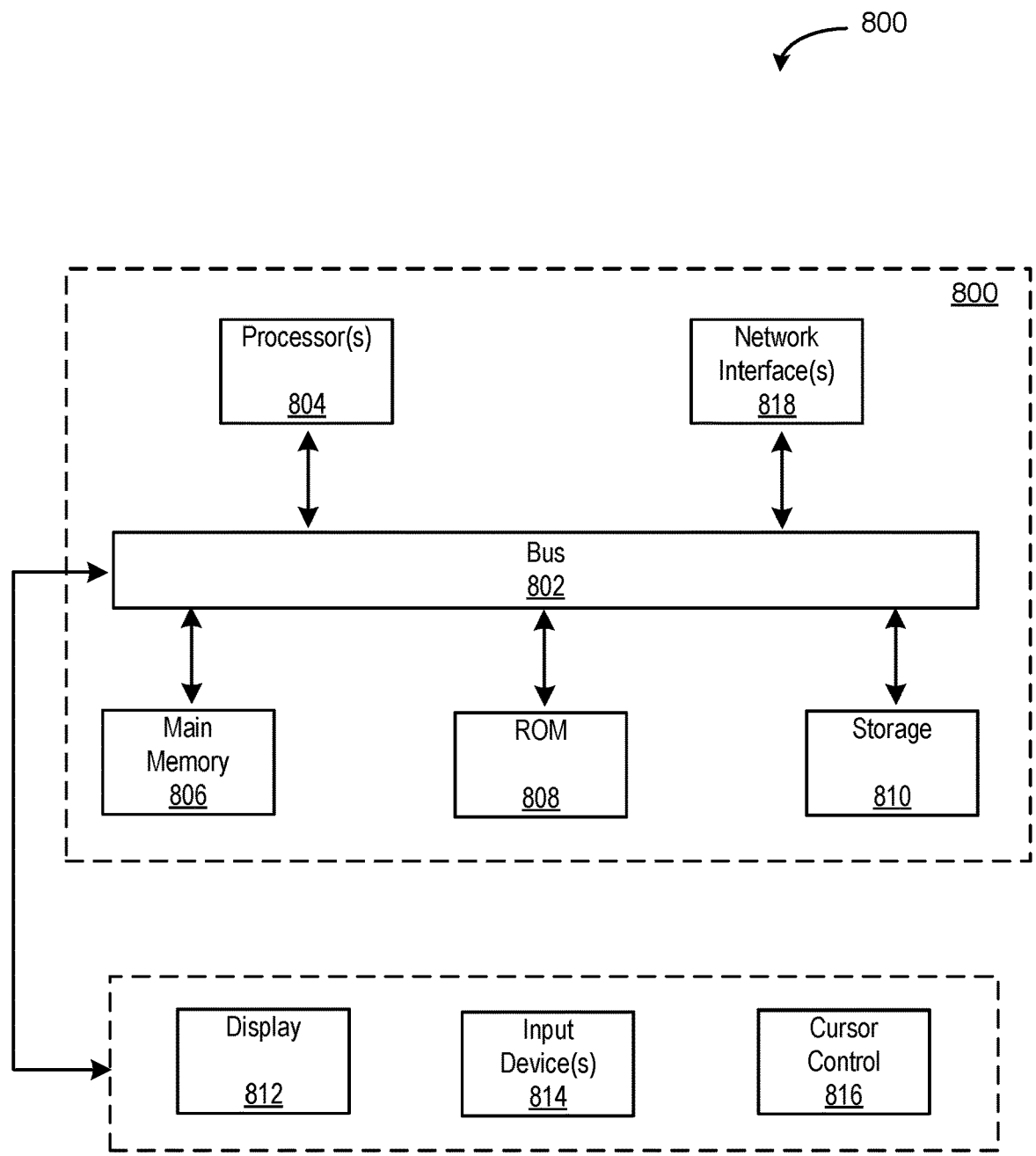
FIG. 8 is an example computing component that may be used to implement various features of embodiments described in the present disclosure.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

What is claimed is:

1. A branch gateway leader of a customer site, comprising:
　at least one processor; and
　a memory storing instructions that, when executed by the at least one processor, cause the branch gateway leader to perform a method comprising:
　　receiving, from one or more secondary branch gateways of the customer site, one or more messages that one or more hosts at the customer site are interested in joining a multicast stream, wherein the branch gateway leader and each secondary branch gateway connect the customer site to an external network;
　　sending, to a cloud-based multicast orchestrator facilitating multicast routes to the customer site, a message that the one or more hosts at the customer site are interested in joining the multicast stream;
　　receiving, from a virtual personal network client (VPNC) associated with the multicast stream, traffic associated with the multicast stream, wherein the VPNC couples the customer site to a source of the multicast stream; and forwarding, to the one or more secondary branch gateways of the customer site, the traffic associated with the multicast stream;

wherein:

the customer site is one of multiple customer sites in a large-scale software-defined (SD) branch deployment connected by a wide area network (WAN);

the cloud-based multicast orchestrator facilitates multicast routes to the SD branch deployment;

the WAN comprises a physical network and a virtual overlay network built on top of the physical network; and the branch gateway leader receives, from the VPNC via an overlay tunnel of the virtual overlay network, the traffic associated with the multicast stream.

2. The branch gateway leader of claim 1, wherein the method further comprises:

receiving, from a given host distinct from the one or more hosts at the customer site, a message that the given host is interested in joining the multicast stream; and forwarding, to the given host, the traffic associated with the multicast stream.

3. The branch gateway leader of claim 2, wherein the given host is coupled to the branch gateway leader and not to one of the one or more secondary branch gateways.

4. The branch gateway leader of claim 1, wherein:

the branch gateway leader and the one or more secondary branch gateways of the customer site are in a local area network (LAN); and the branch gateway leader receives the one or more messages via the LAN.

5. The branch gateway leader of claim 4, wherein:

the branch gateway leader and a given host distinct from the one or more hosts are connected by the LAN; and the branch gateway leader receives, from the given host via the LAN, a message that the given host is interested in joining the multicast stream.

6. The branch gateway leader of claim 5, wherein the message that the given host is interested in joining the multicast stream is sent using an Internet Group Management Protocol (IGMP) protocol.

7. The branch gateway leader of claim 1, wherein the method further comprises receiving, by the branch gateway leader, a route for transmitting the multicast stream between the VPNC and the branch gateway leader, wherein the route is orchestrated at the cloud-based multicast orchestrator.

8. A method, comprising:

receiving, by a branch gateway leader from one or more secondary branch gateways at a customer site, one or more messages that one or more hosts at the customer site are interested in joining a multicast stream, wherein the branch gateway leader and each secondary branch gateway connect the customer site to an external network;

sending, to a cloud-based multicast orchestrator facilitating multicast routes to the customer site, a message that the one or more hosts at the customer site are interested in joining the multicast stream;

receiving, from a virtual personal network client (VPNC) associated with the multicast stream, traffic associated with the multicast stream, wherein the VPNC couples the customer site to a source of the multicast stream; and forwarding, to the one or more secondary branch gateways of the customer site, the traffic associated with the multicast stream;

receiving, from a given host distinct from the one or more hosts at the customer site, a message that the given host is interested in joining the multicast stream, wherein the given host is coupled to the branch gateway leader and not to one of the one or more secondary branch gateways; and forwarding, to the given host, the traffic associated with the multicast stream.

9. The method of claim 8, wherein the customer site is one of multiple customer sites in a large-scale software-defined (SD) branch deployment connected by a wide area network (WAN), and wherein the cloud-based multicast orchestrator facilitates multicast routes to the SD branch deployment.

10. The method of claim 9, wherein the WAN comprises a physical network and a virtual overlay network built on top of the physical network; and the branch gateway leader receives, from the VPNC via an overlay tunnel of the virtual overlay network, the traffic associated with the multicast stream.

11. The method of claim 8, wherein:

the branch gateway leader and the one or more secondary branch gateways of the customer site are in a local area network (LAN); and the branch gateway leader receives the one or more messages via the LAN.

12. The method of claim 11, wherein:

the branch gateway leader and a given host distinct from the one or more hosts are connected by the LAN; and the branch gateway leader receives, from the given host via the LAN, a message that the given host is interested in joining the multicast stream.

13. The method of claim 12, wherein the message that the given host is interested in joining the multicast stream is sent using an Internet Group Management Protocol (IGMP) protocol.

14. The method of claim 8, further comprising receiving, by the branch gateway leader, a route for transmitting the multicast stream between the VPNC and the branch gateway leader, wherein the route is orchestrated at the cloud-based multicast orchestrator.

15. A non-transitory computer-readable storage medium including instructions that, when executed by at least one processor, cause a branch gateway leader of a customer site to perform a method comprising:

receiving, from one or more secondary branch gateways of the customer site, one or more messages that one or more hosts at the customer site are interested in joining a multicast stream, wherein the branch gateway leader and each secondary branch gateway connect the customer site to an external network;

sending, to a cloud-based multicast orchestrator facilitating multicast routes to the customer site, a message that the one or more hosts at the customer site are interested in joining the multicast stream;

receiving, from a virtual personal network client (VPNC) associated with the multicast stream, traffic associated with the multicast stream, wherein the VPNC couples the customer site to a source of the multicast stream;

forwarding, to the one or more secondary branch gateways of the customer site, the traffic associated with the multicast stream;

receiving, from a given host distinct from the one or more hosts at the customer site, a message that the given host is interested in joining the multicast stream, wherein the given host is coupled to the branch gateway leader and not to one of the one or more secondary branch gateways; and forwarding, to the given host, the traffic associated with the multicast stream.

\* \* \* \* \*